United States Patent [19]
Avery et al.

[11] Patent Number: 4,594,575
[45] Date of Patent: Jun. 10, 1986

[54] DIGITAL PROCESSOR FOR SPEECH SIGNALS

[75] Inventors: James M. Avery, Austin, Tex.; Elmer A. Hoyer, Wichita, Kans.

[73] Assignee: NCR Corporation, Dayton, Ohio

[21] Appl. No.: 635,979

[22] Filed: Jul. 30, 1984

[51] Int. Cl.$^4$ .............................................. H03M 1/12
[52] U.S. Cl. ............................................ 340/347 AD
[58] Field of Search ................................ 340/347 AD

[56] References Cited

U.S. PATENT DOCUMENTS 3,656,152 4/1972 Gundersen ................... 340/347 AD

OTHER PUBLICATIONS

D. F. Stout et al. "Handbook of Operational Amplifier Circuit Design", 1976, McGraw-Hill Book Co.
D. Seitzer et al. "Electronic Analog-to-Digital Converters", 1983, John Wiley & Sons.

Primary Examiner—William M. Shoop, Jr.
Assistant Examiner—Saul M. Bergmann
Attorney, Agent, or Firm—Wilbert Hawk, Jr.; Edward Dugas

[57] ABSTRACT

A method and implementation apparatus for converting analog signals, such as speech signals, into digital data signals, with improved fidelity by the use of dithering techniques coupled with amplitude clipping and filtering operations.

9 Claims, 14 Drawing Figures

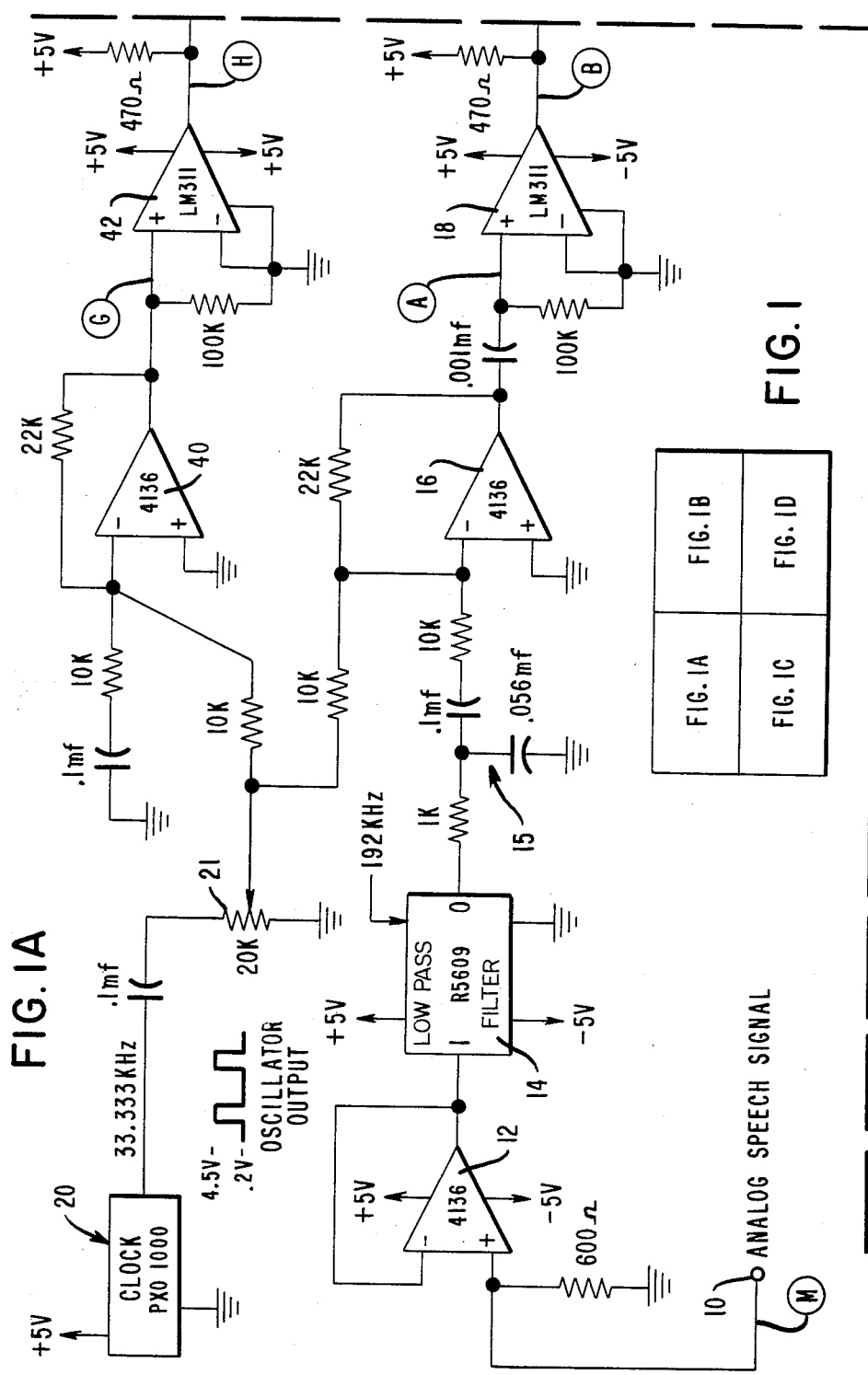

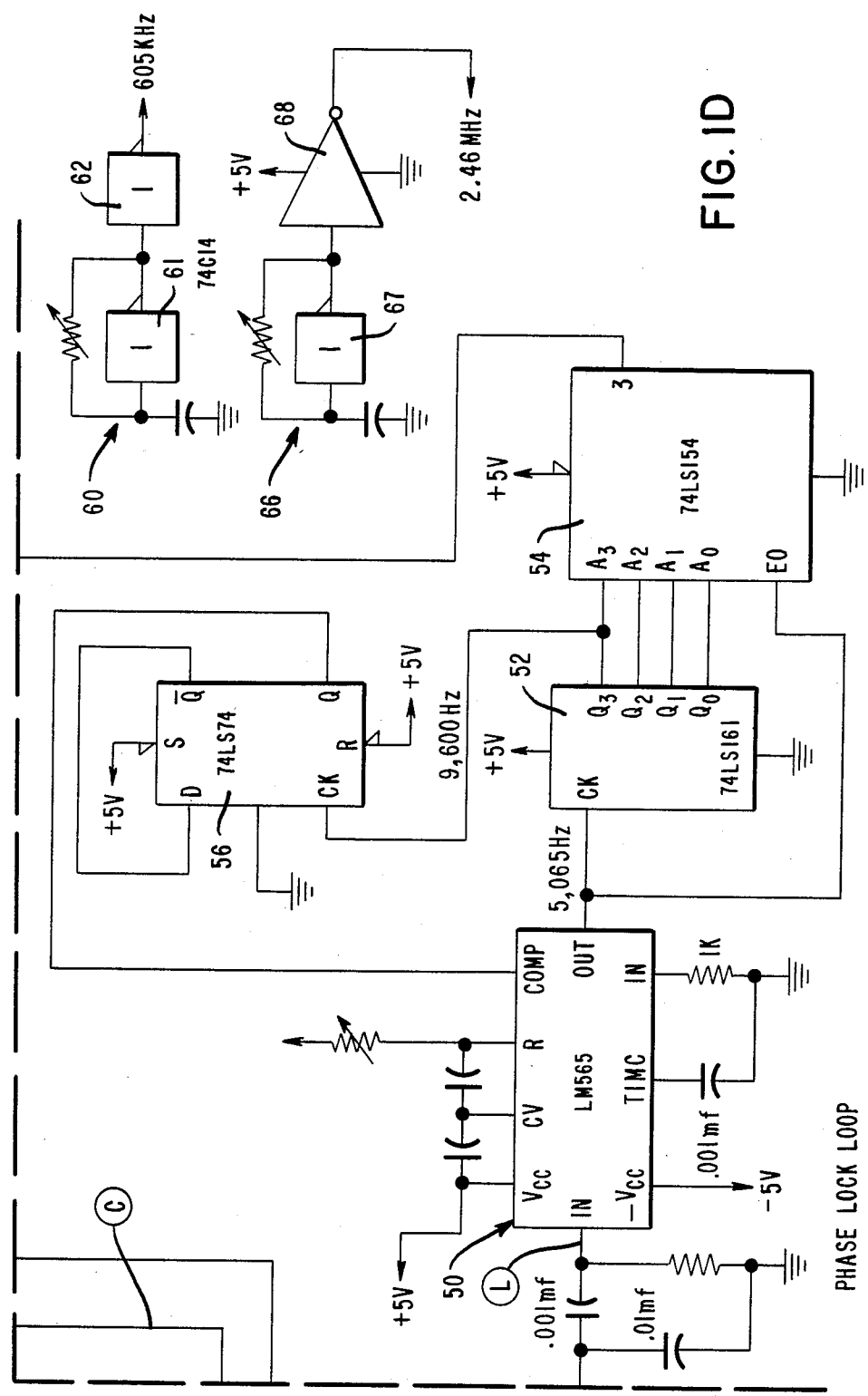
FIG. ID

DIGITAL PROCESSOR FOR SPEECH SIGNALS

BACKGROUND OF THE INVENTION

The present invention relates to the field of conditioning speech signals so that they may act as inputs to computerized systems and more particularly to the field of converting analog speech signals into digital data and vice versa, wherein clipped signal techniques are utilized.

When an analog signal is processed into a digital signal by a system which utilizes a clipping circuit, non-linearities are introduced because the clipping circuit is intrinsically non-linear. Non-linearities generally create harmonic contents in electronic signals which are difficult to filter out. In addition, non-linearities cause signal distortions which affect the fidelity of the information carried by the signal.

An article of interest for its general teachings in the field of present interest is: "Automatic Conditioning of Speech Signals" by G. A. Hellwarth et al., IEEE Transactions on Audio and Electroacoustics, Vol. AV-16, No. 2, pp. 169-179, June 1968;

A patent of interest is U.S. Pat. No. 3,278,685 entitled "Wave Analyzing System" by T. P. Harper, which illustrates the use of clipping circuits in conjunction with the digitizing of speech signals for purposes of voice recognition.

Another U.S. Pat. No. 3,071,652 entitled "Time Domain Vocoder" by M. R. Schroeder illustrates the further use of an infinite clipper in a system for band compressing a telephone message wave.

U.S. Pat. No. 4,015,088 entitled "Real Time Speech Analyzer" by J. J. Dubnowski et al. discloses another system wherein speech signals are conditioned utilizing clipping circuits.

In the article entitled: "Dither Signals and Their Effect on Quantization Noise" by L. Schuchman, IEEE Transaction Communication Technology, Vol. COM-12, pp. 162-165, December 1964. A general discussion of the effect of dither type signals on quantized signals is presented.

The present invention utilizes a dither signal to minimize the distortion in a digital signal representation of a speech signal which representation has been generated by passage through non-linear circuits.

SUMMARY OF THE INVENTION

The present inventive method and system is particularly adapted to converting an analog signal into a digital bit stream signal.

The method of the present invention is comprised of the steps of:

(a) dithering an analog signal with a signal having a frequency substantially greater than that of the analog signal; (b) infinitely clipping the amplitude excursions of the dithered analog signal and (c) sampling the amplitude of the composite signal at a rate corresponding to the desired bit rate for the resultant digital bit stream signal.

In the preferred implementation of the present system there is provided a means for generating a dither signal coupled to a summing means for summing the generated dither signal with an analog signal that is to be digitized to provide a dithered analog signal. An infinite clipper means is coupled to the summing means for infinitely clipping the dithered analog signal. A sampler is coupled to the infinite clipper means for sampling the clipped signal at a desired bit rate so as to produce a digital bit stream signal which is representative of the analog signal.

From the foregoing, it can thus be seen that it is a primary object of the present invention to provide a method and an associated implementation for improving the conversion of an analog signal into a digital bit stream signal.

It is a further object of the present invention to improve the reproducibility of an analog signal that has been converted into a digital signal by the use of a dither signal.

It is another object of the present invention to minimize the effect of a non-linear operation on a digital signal converted from an analog signal by the use of a dither signal.

These and other objects of the present invention will become more apparent when taken in conjunction with the following description and the associated drawings.

BRIEF DESCRIPTION OF THE DRAWINGS

FIG. 1 is a map illustrating the physical relationships of FIGS 1A, 1B, 1C and 1D;

FIGS. 1A, 1B, 1C and 1D illustrate in schematic form the preferred implementation of the present invention.

DESCRIPTION OF THE PREFERRED EMBODIMENT OF THE INVENTION

Figure 1B:
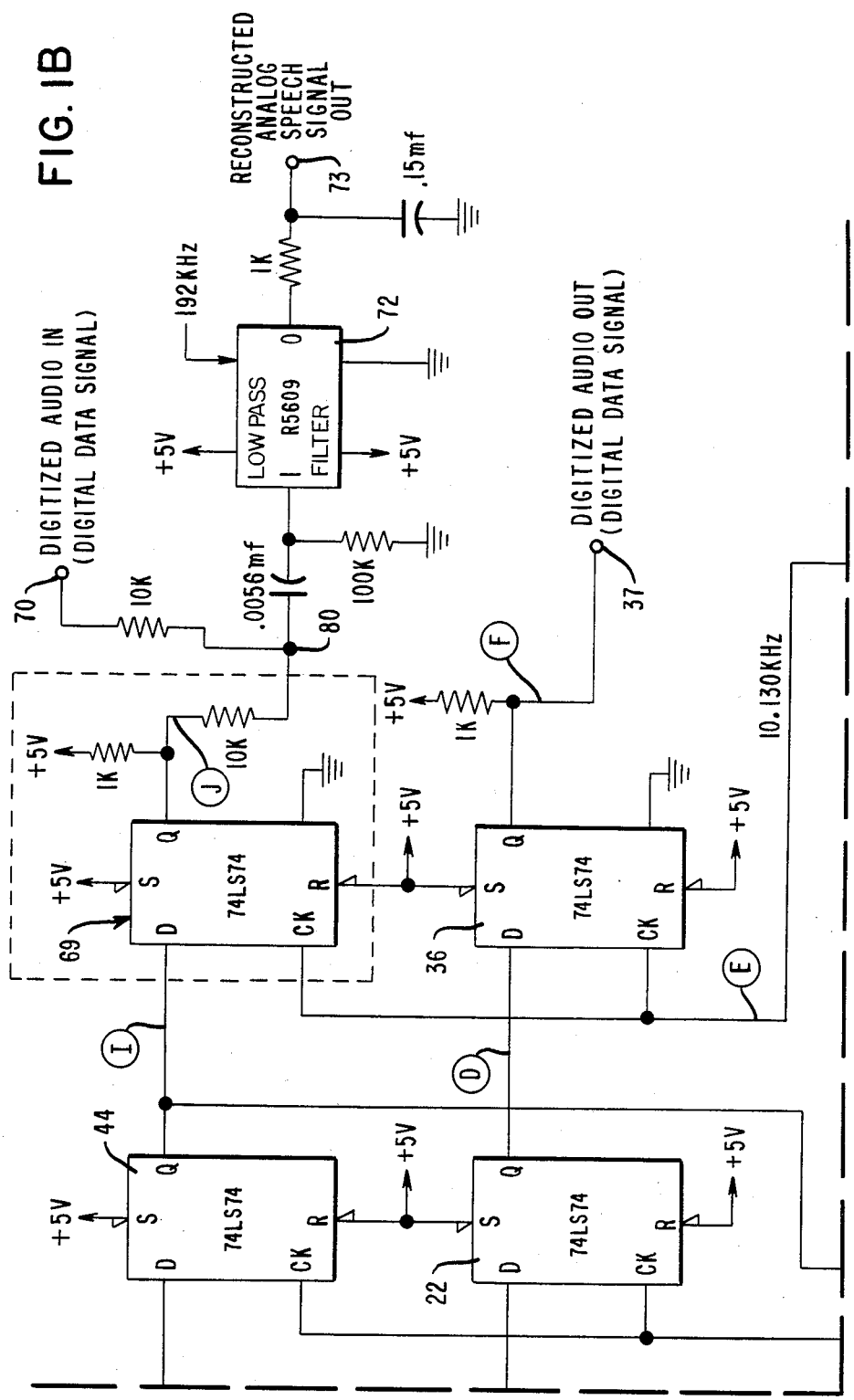
Figure 1C:
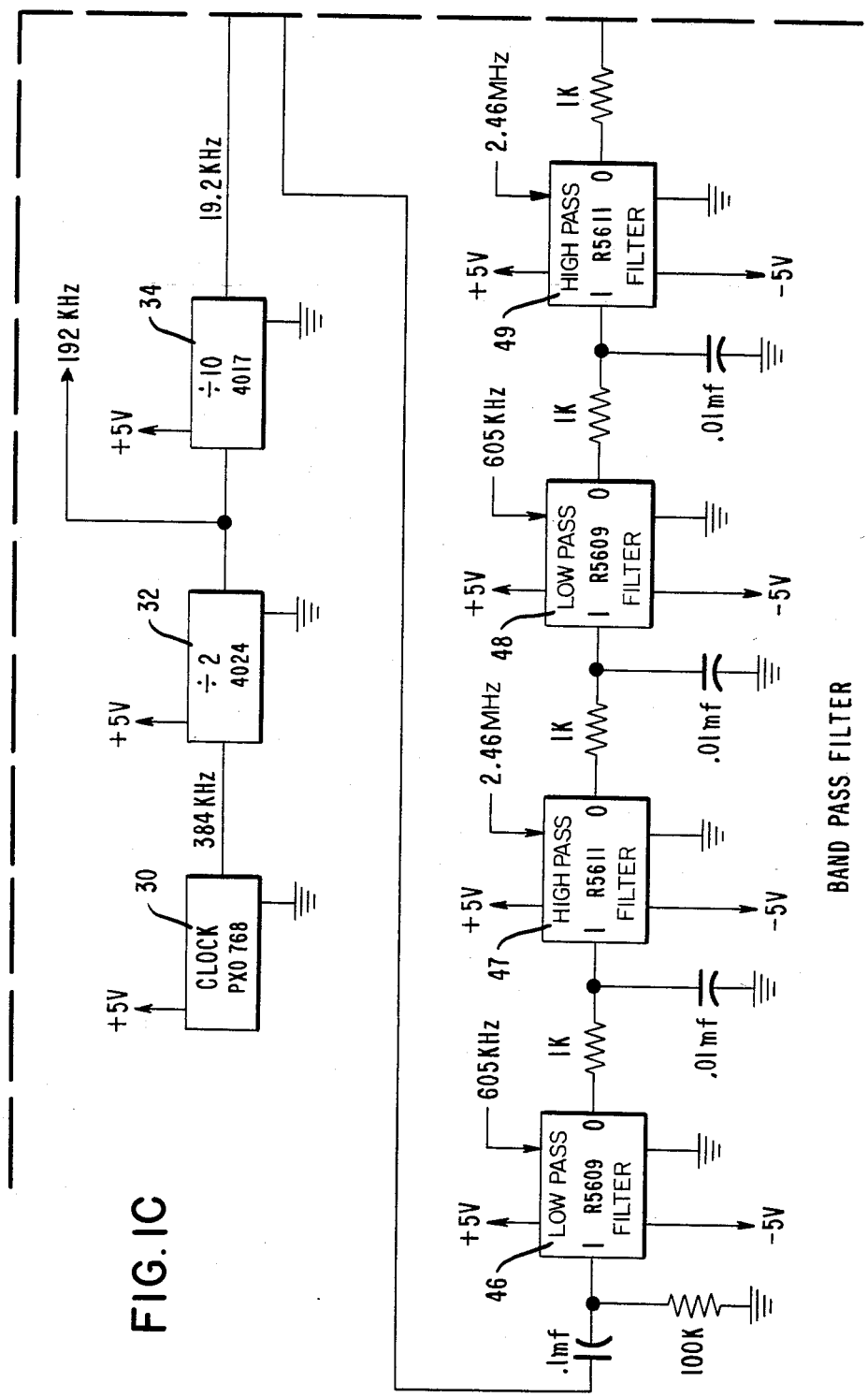
Figure 2:
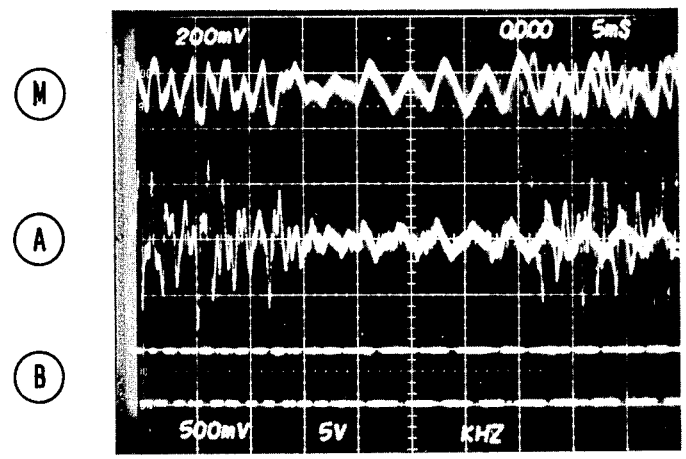
FIGS. 2, 3, 4, 5, 6, 7, 8, 9 and 10 are waveforms, useful in understanding the operation of the invention, taken from selected points of the preferred implementation of FIGS. 1A, 1B, 1C and 1D.
Figure 5:
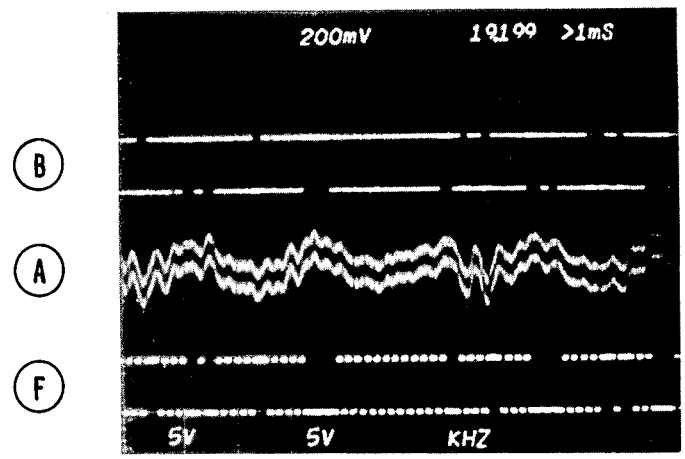
Figure 6:
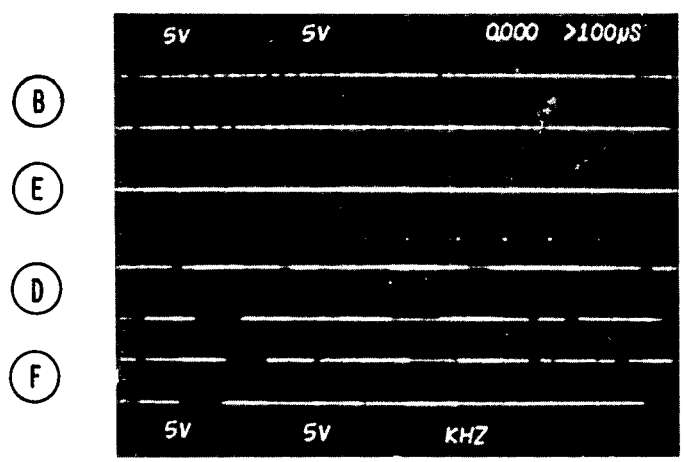

Referring to FIG. 1, the map illustrated therein shows the proper positioning of FIGS. 1A, 1B, 1C and 1D to form the schematic of the preferred implementation of the invention. At various locations in FIGS. 1A, 1B, and 1D there appear capital letters A through M, each surrounded by a circle. The waveforms sampled at these locations correspond to the like labeled waveforms in FIGS. 2 through 10. Due to the wide range of frequencies used in the preferred embodiment of the invention it was necessary to change the time base in FIGS. 2 through 10 to more clearly illustrate the various waveform relationships. For example, in FIG. 2 the waveform Ⓑ corresponds to the like labeled waveform in FIGS. 3, 4, 5 and 6. The time base used for each FIG. appears in the upper right hand corner of the FIGS., e.g., 5 ms for FIG. 2, 20 μs for FIG. 3 and 100 ms for FIG. 4. The advantage of this approach is readily apparent by an examination of FIGS. 2 and 3 wherein the waveform Ⓑ is compared to waveforms Ⓜ and Ⓐ in FIG. 2 and to waveforms Ⓒ and Ⓓ in FIG. 3. Referring to FIG. 1A; at terminal 10, an analog signal, such as the analog speech signal Ⓜ, illustrated in FIG. 2, is applied to the system and is received by an amplifier 12. The amplified analog signal is directed to a low-pass filter 14 which, in the preferred embodiment, cuts off frequency components above 3.8 KHz. Filter 14, in the preferred embodiment, is an R5609, low-pass switched capacitor filter of the type manufactured by EG & G Reticon. The corner frequency of these switched capacitor filters is tunable by the input trigger frequency. For example, filter 14 is tuned by the applied 192 KHz signal. The filtered output signal is directed to a differentiating circuit 15 comprised of resistors and capacitors. The differentiated signal is then applied to the input of a mixing circuit 16, which circuit also receives the output from a crystal controlled oscillator circuit 20, via a potentiometer circuit 21. The oscillator 20 provides the dither signal which signal in the preferred implementation is a square wave and has a frequency of 33.333 KHz. The mixed signals are directed to an input of a zero crossing clipper 18. The mixed signals Ⓐ are illustrated in FIGS. 2 and 5. Clipper 18 is of the infinite clipping type. The clipped dithered speech signal Ⓑ, appearing at the output of clipper 18, is shown in FIGS. 4, 5 and 6.

Figure 3:
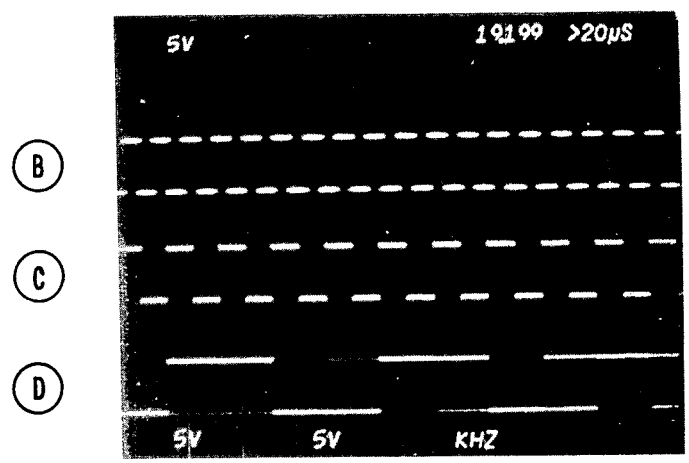
Figure 4:
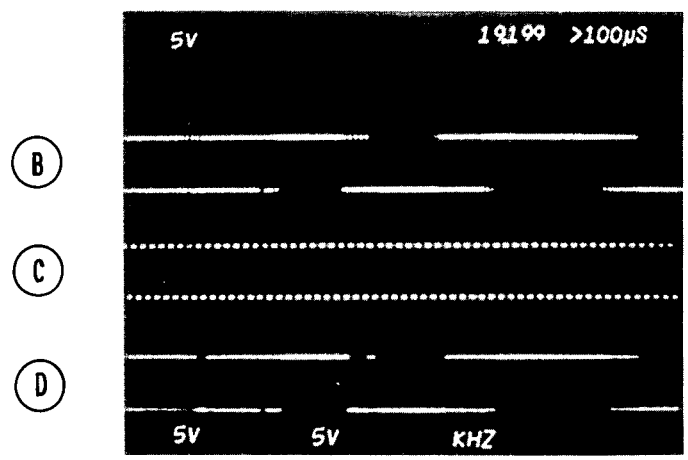
Figure 7:
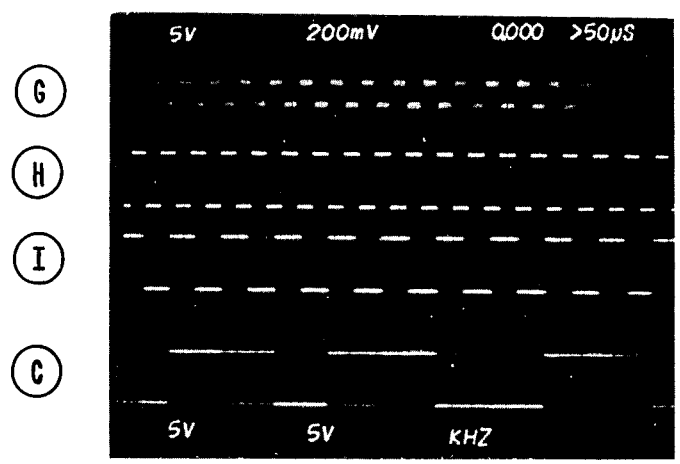

An edge triggered D-type flip-flop 22 receives at its D input the clipped dithered signal Ⓑ, The flip-flop operates as a sampler in response to a clocking signal Ⓒ, which signal appears on its clocking input CK and is illustrated in FIGS. 3, 4 and 7. The clocking signal is derived from a clock signal generator comprised of a crystal controlled oscillator 30, the output of which is a signal of 384 KHz, that is directed to a divide by 2 circuit 32. The output signal from the divide by 2 circuit is a 192 KHz signal that is directed to the input of a divide by 10 circuit 34 and to filter circuits 14 and 72. The output signal from the divide by 10 circuit is a 19.2 KHz signal that is the signal used to clock flip-flop 22 at the desired bit rate. A D-type flip-flop has the characteristic that the signal present at the D input, upon the transition of the clock signal in the positive direction, will transfer that signal to the Q output and the Q output will remain in the state sampled until the occurrence of the next positive clock transition.

Figure 8:
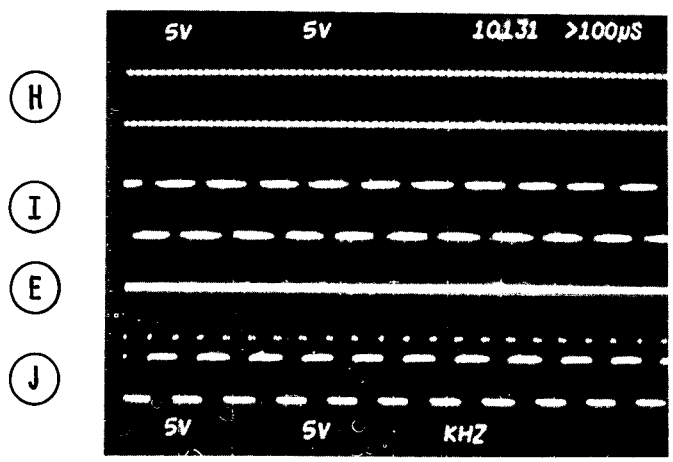
Figure 9:
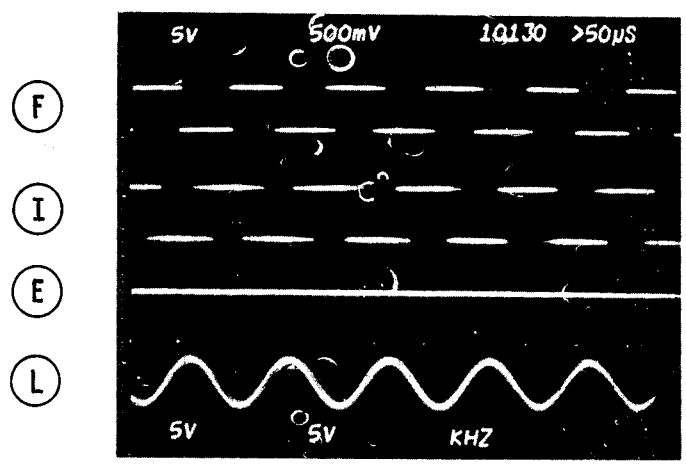
Figure 10:
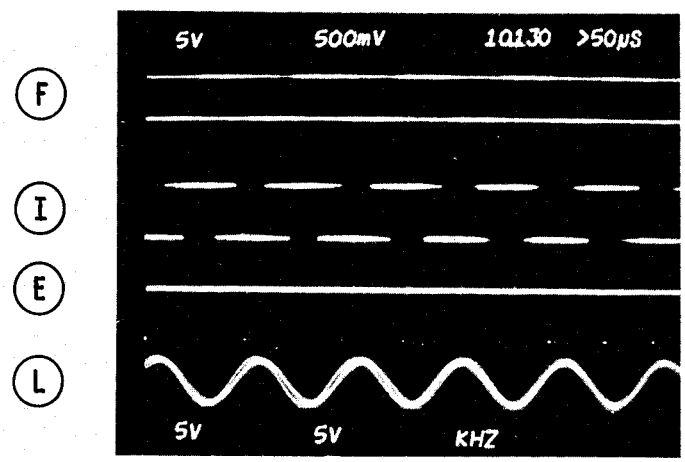

If oscillators 20 and 30 were ideal, so as to maintain their output frequencies exactly, the signal Ⓠ appearing at the Q output of flip-flop 22 (illustrated in FIGS. 3, 4 and 6) would be the usable digital data signal but, in reality, the output frequencies from these oscillators vary. Oscillator variations in turn create a frequency variation that would degrade the fidelity of the transmitted signal and increase the reproducibility problems. In the preferred environment the digital data signal is transmitted over a digital communications channel operating at 9.6 kilobits per second. Therefore, additional circuitry is needed to lock and/or stabilize the sampling rate. A band pass filter network, comprised of circuits 46, 47, 48 and 49, receives from a flip-flop 44 the signal Ⓘ appearing at its Q output which signal is illustrated in FIGS. 7, 8, 9 and 10. (FIGS. 7, 8 and 9 illustrate waveforms without the Ⓜ signal applied to terminal 10). Filters 47 and 49, in the preferred embodiment, are R5611 high-pass filters of the type manufactured by EG & G Reticon. The corner frequency of these high-pass filters is tunable by the input trigger frequency. For example, filters 47 and 49 are tuned by the applied 2.46 MHz signal. The signal Ⓘ is an amplified and clipped version of the dither signal Ⓖ, illustrated in FIG. 7, that follows a parallel path from potentiometer 21 through a mixing circuit 40 and a clipper 42. Elements 40 and 42 correspond to elements 16 and 18, respectively, so that the signal from the oscillator 20 will receive the same propagation delays and other distortions which may be present within the like paralleled circuits. Flip-flop 44 is clocked with the same signal as is used to clock flip-flop 22. The band pass filter has a center frequency of 5065 Hz and a band pass of 1 KHz. The output signal Ⓛ from the band pass filter, illustrated in FIGS. 9 and 10, is directed to a phase lock loop 50 which loop provides at its output a signal of 5.065 Hz in its normalized or unactivated state. A feedback path consisting of a 4 bit binary counter circuit 52 and a D-type flip-flop 56 provides feedback from the phase locked loop and corrects the timing of the sampling signal E, illustrated in FIGS. 6, 8, 9 and 10, that is applied to the clocking inputs of the D-type flip-flops 36 and 69. The signal from circuit 52 and the phase lock loop 50 are directed as inputs to the 1 of 16 decoder circuit 54. The output of circuit 54 is the corrected sampling signal Ⓔ, which signal in the preferred implementation has an average center frequency of 10.130 KHz. In operation, the phase locked loop has a range of operation between 4.5 KHz and 5.5 KHz to provide the correctly sampled digital data signal Ⓕ, illustrated in FIGS. 5, 6, 9 and 10, that appears at the output terminal labeled 37. From the foregoing it can be appreciated that flip-flop 36 operates as a second sampler.

The digital data signal Ⓕ, appearing at terminal 37, may be directed to any communications channel apparatus for further transmission and/or processing.

An oscillator circuit with feedback 60, comprised of inverters 61 and 62, are the source of the 605 KHz signal used by the band pass filter elements 46 and 48. The feedback inverting circuit 66, comprised of inverter 67 and inverter 68, generate the 2.46 MHz signal which is used by the filter elements 47 and 49.

From the foregoing description of the preferred implementation it can be seen that an analog signal is received on terminal 10 and that the analog signal is mixed with a dither signal. The mixed signals are then clipped and the clipped signals are sampled at the desired bit rate to provide a digital data output signal.

In order to reconstruct the analog signal from the digitized audio output signal, the digitized audio output signal is applied to input terminal 70 shown in FIG. 1B. The output of flip-flop 44 is directed, as previously stated, to the D input of flip-flop 69. The signal Ⓙ at the Q output of flip-flop 69, illustrated in FIG. 8 should correspond, except for the sampled analog speech component, to the signal Ⓕ at the Q output of flip-flop 36. Therefore, if the signal at the Q output of flip-flop 69 is subtracted from the signal at terminal 70, the remaining component is the analog input signal. This subtraction process is accomplished at the point labeled 80 in the circuit and the result therefrom is directed to a low-pass filter 72 to provide to terminal 73 the reconstructed analog speech signal.

While there has been shown what is considered to be the preferred method and implementation of the present invention, it will be manifest that many changes and modifications can be made therein without departing from the spirit and scope of the invention. It is intended, therefore, in the annexed claims to cover all such changes and modifications as may fall within the true scope of the invention.

We claim:

1. A digital processor for converting an analog signal into a digital bit stream signal comprising:
   source means for providing a dithering signal;
   mixing means for mixing said provided dithered signal with an analog signal;
   clipping means for clipping the mixed signal from said mixing means; and
   sampler means for sampling the clipped signal from said clipping means at a desired rate so as to produce a digital bit stream signal.

2. The digital processor according to claim 1 wherein said mixing means is a summing circuit having as inputs, to be summed, said dithered signal and the analog signal to be converted.

3. The digital processor according to claims 1 wherein said clipping means is an infinite clipper.

4. The digital processor according to claim 1 and further comprising:
   an amplifier means preceding said mixer means for amplifying the analog signal to be converted into a digital bit stream signal; and
   low-pass filter means interposed between said amplifier means and said mixer means means for filtering the amplified analog signal.

5. The digital processor according to claim 1 and further comprising;
   a second sampler means responsive to the frequency of said dithering signal and to the rate of sampling by the first-mentioned sampler means for maintaining the difference between said frequency and said rate of sampling at substantially a pre-selected value by varying the rate of sampling of said sampler means.

6. A method for converting an analog signal into a digital bit stream signal comprising the steps of:
   (a) dithering an analog signal with a signal having a frequency substantially greater than that of the analog signal;
   (b) clipping the amplitude excursions of the dithered analog signal to produce a digital signal; and
   (c) sampling the amplitude of said produced digital signal at a rate corresponding to the desired bit rate to provide a digital bit stream signal.

7. The method according to claim 6 and further comprising the step of filtering the analog signal prior to its being dithered per step (a).

8. The method according to claim 6 wherein the rate of sampling, per step (c), is varied so as to maintain the difference between the dithering signal frequency and the sampling rate at a pre-selected constant.

9. A method for recovering an analog signal that has been converted into a digital bit stream by a method which utilized dithering, clipping and sampling steps, comprising the steps of:
   (a) subtracting a composite signal comprised of the dithering signal and the sampling signal from the digital bit stream to arrive at a resultant signal; and
   (b) filtering the resultant signal to recover the analog signal.

* * * * *